H. KLATT.
AUTOMOBILE SIGNAL.
APPLICATION FILED MAR. 24, 1919.
1,351,662.
Patented Aug. 31, 1920.
3 SHEETS—SHEET 1.
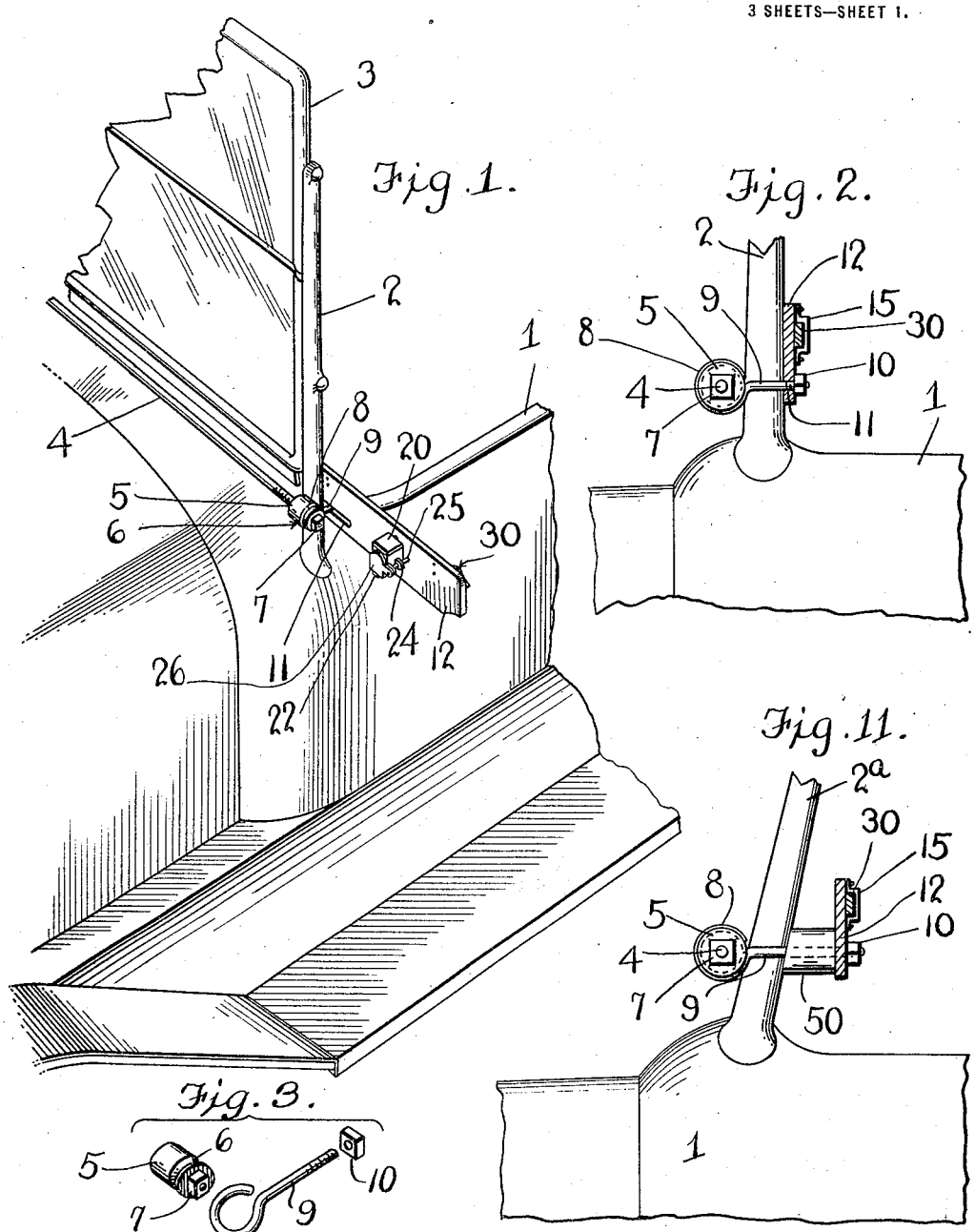
Witnesses
Inventor
Herman Klatt
By Victor J. Evans
Attorney

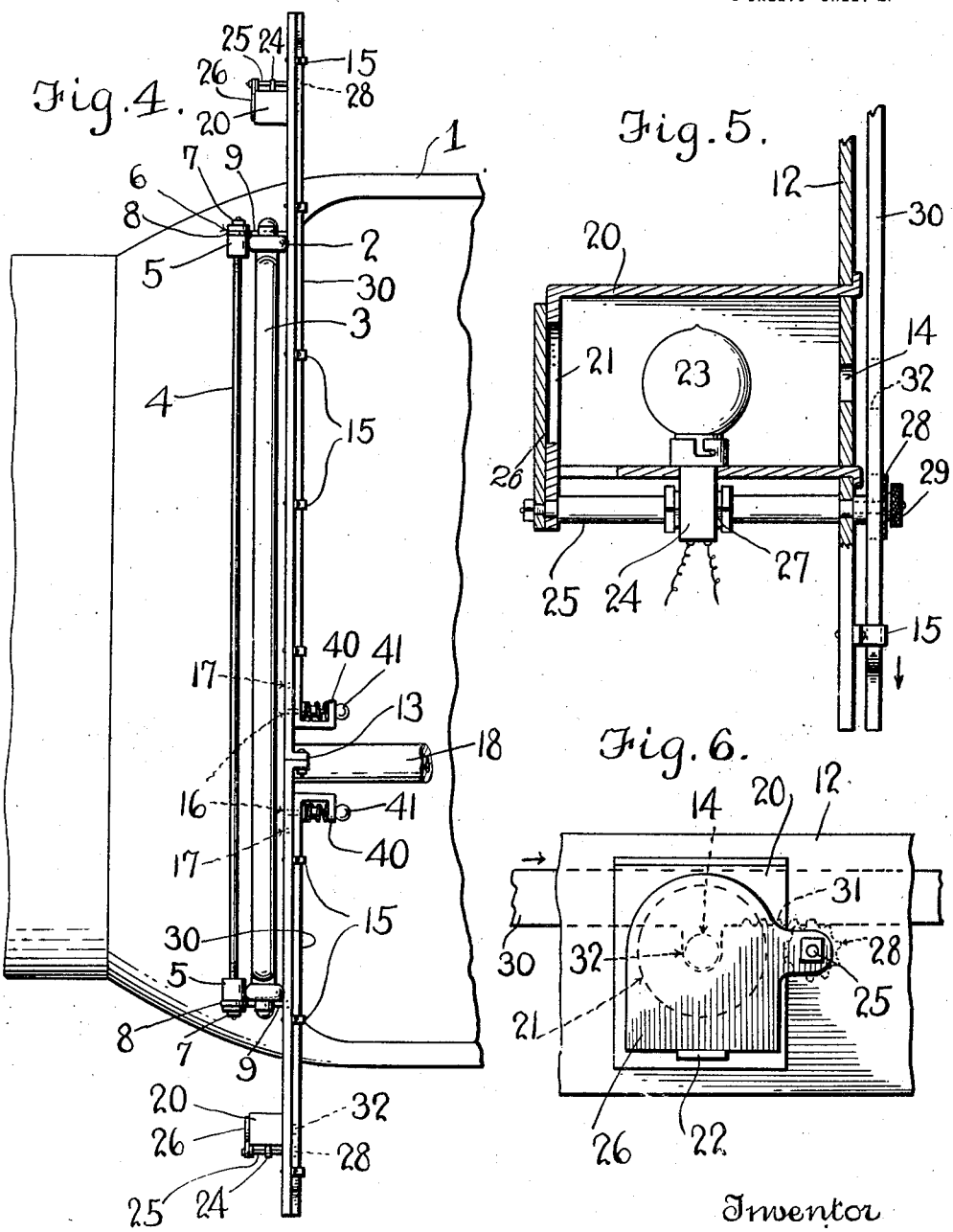

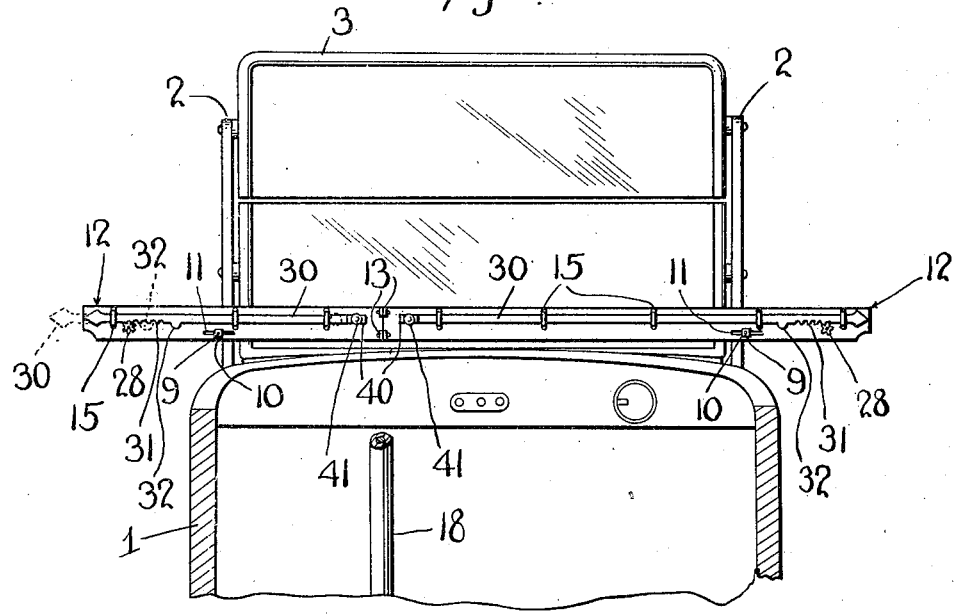
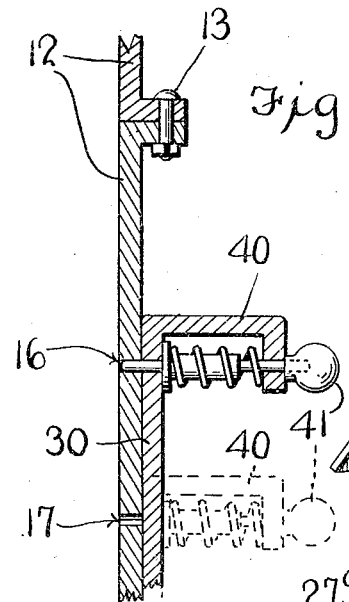
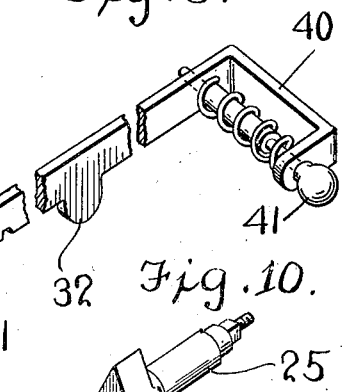
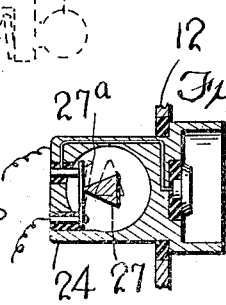

UNITED STATES PATENT OFFICE.

HERMAN KLATT, OF PUEBLO, COLORADO.

AUTOMOBILE-SIGNAL.

1,351,662.  Specification of Letters Patent.  Patented Aug. 31, 1920.

Application filed March 24, 1919. Serial No. 284,564.

*To all whom it may concern:*

Be it known that I, HERMAN KLATT, a citizen of the United States, residing at Pueblo, in the county of Pueblo and State of Colorado, have invented new and useful Improvements in Automobile-Signals, of which the following is a specification.

The object of my invention is to provide simple, easily applied and quickly operated means for indicating the direction a motorist intends to take in approaching a turn.

The invention contemplates the attachment of the indicating or signaling means to the wind-shield of an automobile without entailing any change whatsoever in the construction of the wind-shield.

The invention also contemplates the provision of signaling means of the kind defined adapted to be used to advantage in the day as well as in the night, and to convey the desired information to persons following a car as well as to persons in front of a car. Other objects and practical advantages of the invention will be fully understood from the following description and claim when the same are read in connection with the drawings, accompanying and forming part of this specification, in which:

Figure 1 is a perspective illustrative of the manner of applying the signal constructed in accordance with my invention.

Fig. 2 is an enlarged fragmentary section, showing the mode of attachment at one side of the wind-shield frame.

Fig. 3 comprises disconnected perspectives of parts that enter into said attachment.

Fig. 4 is a detail plan view of the complete signal apparatus, showing the same applied.

Figs. 5 and 6 are enlarged detail views illustrative of the casing and other lamp appurtenances.

Fig. 7 is a transverse section showing the complete apparatus from a point in rear thereof.

Figs. 8, 9, 10 and 10ª are enlarged detail views better illustrating certain elements of the apparatus.

Figs. 11 and 12 are views of a modification hereinafter specifically referred to.

Similar numerals designate corresponding parts in Figs. 1 to 10, to which reference will first be had.

The automobile body 1 is shown as provided with the usual frame or uprights 2 to carry the wind-shield 3.

In furtherance of my invention I arrange in front of the uprights 2 a transverse rod 4, the end portions of which are threaded as shown, for the mounting of interiorly threaded members 5, one of which is best shown in Fig. 3. Each of the said members 5 comprises a circular portion adaped to be opposed to the forward side of one upright 2 and in which is a circumferential groove 6, and an outer end portion 7 of angular form in cross-section to constitute a wrench hole. Embracing the circumferentially grooved portions of the members 5 are eyes 8, the shanks 9 of which are carried rearwardly alongside the uprights 2 and are equipped with nuts 10. The said shanks 9 of the eyes 8 are extended rearwardly through longitudinal slots 11 in the body bar 12 of the apparatus, which body bar is disposed transversely of the automobile and immediately in rear of the uprights 2, as best shown in Fig. 4. I prefer to form the body bar 12 in two sections, the opposed ends of which are flanged and bolted together, as indicated by 13. In the said body bar 12 I provide at points outwardly beyond the sides of the body 1, apertures 14. It will also be noted by particular reference to Fig. 7 that the body bar 12 is provided with a plurality of guides 15, and by reference to Figs. 4 and 8 it will be noted that the body bar is provided with pairs of apertures 16 and 17; the said pairs being located at opposite sides of the longitudinal vertical plane of the steering post 18 of the machine, as appears in Fig. 4. Connected to and disposed in front of the body bar 12 and in communication with the apertures 14 are the lamp casings 20 of the device; the said lamp casings being provided in their forward ends with apertures 21. The forward walls of the lamp casings are extended laterally beyond the outer side walls thereof, as best shown in Fig. 5, and on each front wall of the casings a stop 22 is provided, as best shown in Fig. 6. Complementary to each lamp casing is an incandescent electric lamp 23 with which is connected a lamp socket 24 partially disposed outwardly beyond the outer side wall of the lamp casing. The switch in the said socket 24 is controlled by a shaft 25. The shaft 25 is journaled in the lateral portion on the front wall of the casing 20 and is also journaled in and held against endwise movement by the body bar 12. Suitably fixed and retained upon the forward end of the shaft 25 is a shutter 26 complementary to the opening 21 and adapted when closed to bring up against the stop 22. The scheme of my invention contemplates the operation of each shaft 25 to cause the filament of the lamp 23 to glow at the time that the shutter 26 is in open position; and it also contemplates closing of the shutter 26 simultaneously with the cutting off of current from the lamp 23. The utility of this will be appreciated when it is stated that in their closed positions the shutters 26 will exclude dust and dirt from the interiors of the casings and the lamps, and the shutters will be opened when necessary—i. e., at the times that the filaments of the lamps are glowing. Toward said end I provide on the shaft 25 and in the socket 24 a triangular portion 27, Figs. 10 and 10$^a$, the said triangular portion 27 being so arranged that the circuit will be completed at the point 27$^a$ when the shutter 26 is opened, and will be interrupted when said shutter is closed. On each of the shafts 25 and in rear of the body bar 12 is a spur gear 28; said spur gear 28 being frictionally fixed to the shaft by a knurled nut 29, so that when the said nut is turned rearwardly, the spur gear is rendered loose on its respective shaft 25. This provision is made in order that the shutters 26 will not be moved and the lamps will not be operated when the pointer members 30 are operated in the daytime. The said pointer members 30 are movable rectilinearly in the guides 15 on the body bar 12, and each pointer member is provided with a rack 31 intermeshed with the adjacent spur gear 28. From this it follows that when one of the pointer members 30 is moved outwardly, the gear 28 that it engages will be rotated, and this is also true when the pointer member is moved inwardly. Each pointer member is also provided at an intermediate point with an enlargement 32, and preferably has its outer end portion in the form of an arrow head. The enlargements 32 of the pointer members are adapted to rest opposite the openings 14 when the pointer members are in idle position, this in order to enable said enlargements 32 to prevent the display of light toward the rear when continuously lighted lamps are employed in the casings 20, as may sometimes be done. When, however, either pointer member 30 is moved outwardly for signaling purposes, its enlargement 32 will be carried out of registration with the adjacent opening 14 so as not to obscure the showing of the light through said opening 14. As best shown in Figs. 8 and 9, each pointer member is provided at its inner end with an enlarged portion 40 in which is mounted a spring-pressed latch 41. The latches 41 are designed to seat in the apertures 16 of the body bar 12 when the pointer members 30 are in idle position, and are also adapted to seat in the apertures 17 with a view to retaining the pointer members in their extended positions.

It will be apparent from the foregoing that when the driver of the car contemplates turning toward the left, in Fig. 7, it is his province to release and move the left-hand pointer member 30 outwardly into the position shown by dotted lines, with a view to apprising the occupant of a following vehicle of the purpose of the said driver. The signal referred to will also be in plain view of persons in front of the car, and when the signal is made at night, lights will be shown both at the front and at the rear of the left-hand lamp casing 20. When the driver of the car shown in Fig. 7 contemplates making a turn toward the right, the right-hand pointer member 30 is extended outwardly. It will also be understood that subsequent to the use of either of the pointer members 30, the same is retracted and detachably secured in its idle position.

In Fig. 11 wherein my improvement is shown applied to inclined uprights 2$^a$, a block 50, apertured at 51, as shown in Figs. 11 and 12, is mounted upon the shank 9 of each eye 8 and is interposed between the body bar 12 and the adjacent upright 2$^a$. The forward sides or ends of the blocks 50 are beveled as illustrated, and hence the body bar 12 will be maintained in strictly upright position, notwithstanding the inclination of the uprights 2$^a$.

It will be apparent from the foregoing that my improvement constitutes simple and efficient means through the medium of which the driver of an automobile may quickly and adequately signal to those before and behind his car the course he intends to follow when he reaches a turn that he is approaching.

Having described my invention, what I claim and desire to secure by Letters Patent, is:

In an automobile direction signal, the combination of carrying means, a rectilinearly movable pointer member on said carrying means and provided with a rack, an incandescent electric lamp on the carrying means, and a switch complementary to said lamp and comprising a turning member provided with a gear that is intermeshed with the rack; manipulation of said turning member bringing about completion or interruption of the circuit connected with the lamp.

In testimony whereof I affix my signature.

HERMAN KLATT.